United States Patent [19]

Rohrl et al.

[11] 3,984,578

[45] Oct. 5, 1976

[54] METHOD FOR BAKING FOOD IN A CLOSED COOKING SPACE IN WHICH HEATED AIR IS CIRCULATED

[75] Inventors: Franz Rohrl, Obing; Josef Ackermann; Heinrich Detterbeck, both of Traunreut, all of Germany

[73] Assignee: Siemens Electrogerate GmbH, Munich, Germany

[22] Filed: Nov. 26, 1973

[21] Appl. No.: 418,980

[30] Foreign Application Priority Data
Nov. 24, 1972  Germany............................ 2257795
Feb. 8, 1973  Germany............................ 2306265
Oct. 18, 1973  Germany............................ 2352340

[52] U.S. Cl............................. 426/523; 126/21 A; 426/233
[51] Int. Cl.²........................................ A23L 1/01
[58] Field of Search .......... 219/400, 411; 126/21 A; 432/25, 12; 426/94, 95, 523, 233, 238; 99/474, 470, 447

[56] References Cited
UNITED STATES PATENTS

| | | | |
|---|---|---|---|
| 3,348,023 | 10/1967 | Lewis et al..................... | 126/21 R X |
| 3,367,316 | 2/1968 | Eff.................... | 219/400 X |
| 3,384,068 | 5/1968 | Perry et al. ........................ | 126/21 A |
| 3,529,582 | 9/1970 | Hurko et al...................... | 126/21 A |
| 3,626,155 | 12/1971 | Joeckel.............................. | 219/411 |
| 3,682,643 | 8/1972 | Foster................................. | 426/233 |

*Primary Examiner*—S. Leon Bashore
*Assistant Examiner*—Kenneth M. Schor
*Attorney, Agent, or Firm*—Kenyon & Kenyon Reilly Carr & Chapin

[57] ABSTRACT

A method and apparatus for baking food in a closed cooking space in which heated air is circulated. The temperature of this heated air is varied in a sawtooth fashion about a predetermined mean temperature value by generating a plurality of sequential heat radiation pulses, by means of electric air heaters or the like, of a predetermined amplitude, frequency, and duration for baking the food with a minimum of soiling of the cooking space.

17 Claims, 2 Drawing Figures

METHOD FOR BAKING FOOD IN A CLOSED COOKING SPACE IN WHICH HEATED AIR IS CIRCULATED

BACKGROUND OF THE INVENTION

1. Field of the Invention

This invention relates to both a method and an apparatus for baking food in a closed cooking space in which heated air is circulated.

2. Description of the Prior Art

Known forced air convection type baking ovens and methods are generally characterized by efficient heat transfer between the oven and the food baked, and thus shorter cooking times. If the temperature of the heated air in the oven is maintained within definite limits, generally below 160°C and preferably at about 145°C soiling of the baking oven during cooking can be almost completely eliminated. Under such cooking conditions, however, browning and even crust formation of the food baked cannot be achieved because the baking temperature is too low. Oven air temperatures which are sufficient to achieve such browning and crust formation generally range about 200°C and cause considerable undesirable soiling of the oven walls.

SUMMARY OF THE INVENTION

It is therefore an object of the invention to provide both a method and an apparatus for baking food in a closed cooking space by means of circulated heated air which achieves the browning and crust formation desired of the food baked without soiling the baking oven.

This and other objects of the invention are achieved by a method and a baking oven for baking food in a closed cooking space by means of circulated heated air in which the temperature of the heated air is varied in sawtooth fashion about a mean temperature valve which is no greater than 160°C by generating heat radiation pulses of a predetermined amplitude, frequency and duration which substantially increase the temperature of the heated air for a short period of time in order to rapidly raise the surface temperature of the food baked in the oven to produce the desired browning and even crust formation thereof with a minimum of soiling of the cooking space of the oven.

It is known in the art per se to bake foods by means of circulated heated air and infrared radiation pulses. In such methods and apparatus, the temperature of the heated air and the timing of the generation of the radiation pulses are controlled so that heating of the cooking space of the oven is effected as rapidly as possible without overheating of the surface of the food baked. As a result, the maximum food surface and heated air temperatures in such ovens are generally less than 100°C, well below those temperatures required for baking.

In contrast, the invention is based on the discovery that the power, duration, spacing and number of radiation pulses can be regulated to achieve the desired baking result without soiling the oven cooking space if the thermal energy required to bake the food in the oven is maintained at relatively low temperature levels. It has been found that soiling of the inner walls of the cooking space can be eliminated by assuring that the change in the heated air temperature caused by the generated radiation pulses occurs about a mean temperature value which is below 160°C. The term "mean temperature value" as used herein designates the integral of the heated air temperature curve during the last one third of the food baking time, divided by this last one third of the food baking time.

DETAILED DESCRIPTION

In the method of the invention, the food is baked in a closed cooking space by circulating heated air therewithin. The temperature of this heated air is varied about a mean temperature value which is less than about 160°C and greater than about 120°C, and preferably ranging between about 135°C and 145°C. The temperature of the heated air is varied in sawtooth fashion about this mean temperature value by generating a plurality of sequential heat radiation pulses having a predetermined amplitude, frequency and duration. By pulse amplitude is meant herein the difference between the maximum and minimum values of the heat radiation pulses. For a mean temperature value of the heated air of 120°C, the pulse amplitude is at least 70 centigrade degrees; for a mean temperature value of 160°C, the pulse amplitude is at least 25 centigrade degrees; and for a mean temperature value ranging between 135°C and 145°C, the pulse amplitude ranges between about 50 and 100 centigrade degrees. Radiation pulses of such amplitude produce a rate of rise of the temperature of the heated air during generation thereof of at least 5 centigrade degrees corresponding to a pulse amplitude of 25 centigrade degrees, and for the preferred mean temperature value, produce a rate of rise ranging between about 10 and 20 centigrade degrees per minute.

Figure 2:
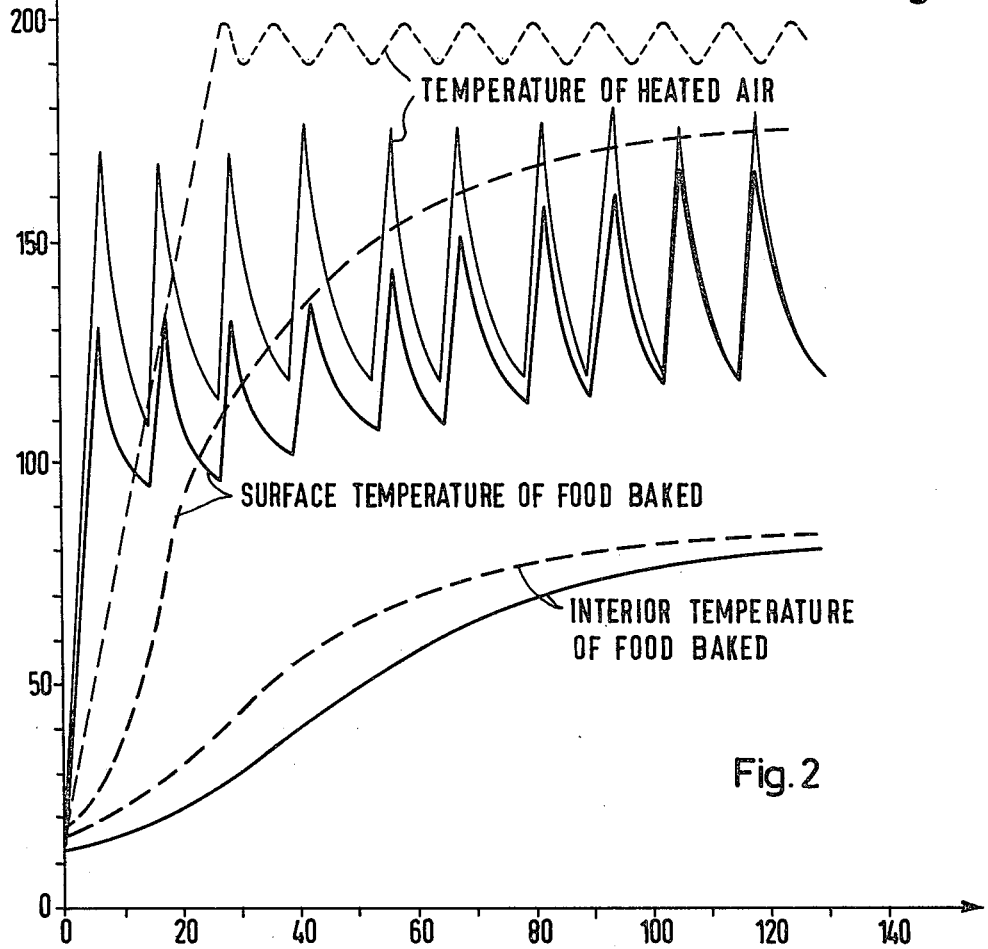
FIG. 2 is a graphical illustration comparing the temperature of the heated air, the surface temperature of the food baked, and the interior temperature of the food baked, plotted versus baking time, for both conventional ovens and ovens constructed according to the invention.

The generation of the heat and radiation pulses is preferably carried out so that the pulses are uniformly distributed over the entire baking time of 140 minutes shown in FIG. 2, and the frequency of generation of the pulses is such that each is spaced apart from prior and subsequent pulses by a period of time of at least 5 minutes. For the preferred mean temperature value, the heat radiation pulses are spaced apart by a period of time ranging between about 10 and 20 minutes. Higher heated air temperatures can be obtained, if desired, by increasing the pulse spacing, and vice versa. However, it should be noted that rapid pulse generation can cause excessive heating and, therefore, spattering. Since the minimum pulse spacing is dependent upon the type of food baked, the position of the food within the cooking space, and the intensity of the heat radiation pulses, practically speaking it is preferable to provide a tolerance margin from this minimum spacing of the pulses to prevent the soiling of the cooking space. Corresponding tolerance margins are also advisable for all stated limits if it is desired to assure that sufficient browning of the food is achieved without soiling, irrespective of the type and quantity of the food baked, its postion within the cooking space, and the manufacturing tolerances of the oven utilized.

The maximum surface temperature of the food baked should be less than about 175°C, and preferably below 165°C. However, this temperature limitation is important only during the last one third of the total baking time. The described temperature limitations are chosen to assure that in almost all cases minimum soiling of the cooking space occurs. Generally speaking, however, it is preferable to maintain a margin of tolerance from these limits if soiling due to spattering is to be reliably prevented under all cooking conditions. The heat radiation pulses generated cause the surface temperature of the food baked to rise at a rate of at least 5 centigrade degrees per minute, and for the preferred mean temperature value and food surface temperature, to rise at a rate of at least 10 centigrade degrees per minute. The surface temperature of the food baked is varied in similar sawtooth fashion (as shown in FIG. 2) in response to the heat pulses generated to produce a plurality of sequential surface temperature pulses having an amplitude which ranges between about 10 and 50 centigrade degrees.

Although it is preferable to distribute the heat radiation pulses generated over the entire baking time in a uniform manner, the food baked may be subjected to the heat radiation pulses only during the first half of the baking time, if desired. Also, although it is preferable to circulate the heated air within the cooking space during the entire baking time to achieve a uniform cooking of the food, good results are also obtained if the circulation of the heated air within the cooking space is interrupted during the generation of the heat radiation pulses. This interruption of circulation causes the heat radiation pulses to rise at a more rapid rate.

Figure 1:
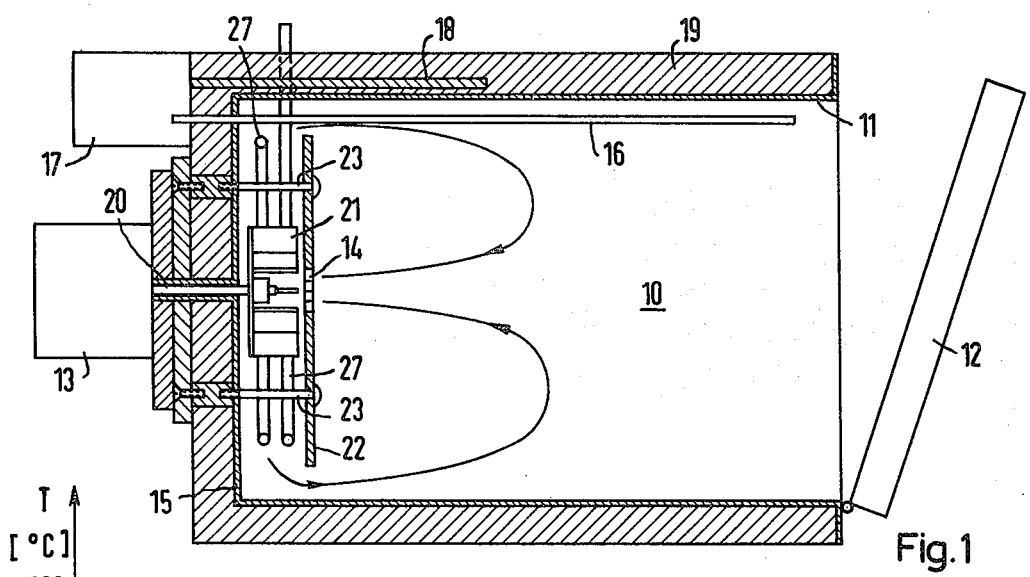
FIG. 1 is a cross-sectional side view of one embodiment of an electric baking oven constructed according to the invention.

Referring now to the drawings, in particular FIG. 1, there is shown an electric baking oven constructed according to the invention by which the above described method is implemented. The oven includes a muffle 11 enclosing a cooking space 10 about which thermal insulation material 19 is disposed. A hinged door 12 is provided for giving access to cooking space 10. The thermal insulation material used, and the dimensions of the muffle 11, are similar to those of ordinary home baking ovens having a volume of about 50 liters. The depth of the muffle 11, however, is somewhat greater than in such conventional ovens. Means for heating air and circulating heated air within cooking space 10, including a grill heater 16 disposed beneath the upper wall of muffle 11, is also provided. This means comprises a grill heater 16 in combination with an annular electric air heater 27, which is disposed adjacent rear wall 15 of muffle 11 concentrically about a fan wheel 21. The fan wheel is mounted on the shaft 20 of an electric motor 13 which drives wheel 21. Wheel 21, motor 13 and shaft 20 in combination form a blower for circulating the heated air within space 10. Air heater 27 and fan wheel 21 are shielded by a baffle plate 22 disposed parallel to rear wall 15 and coupled thereto by means of bolts 23. The baffle plate is smaller than the interior of the cooking space 10 so that a narrow gap is provided about its periphery through which heated air is blown into cooking space 10 by fan wheel 21. A centrally disposed aperture 14 is provided in the center of baffle space 22 through which air is drawn from cooking space 10 to the space behind baffle plate 22 by fan wheel 21.

Grill heater 16 may be a tubular heater comparable in design and dimension to conventional grill heaters used in ordinary electric home baking ovens. The heater generally has a power rating of at least 2000 watts, and preferably 2800 watts. The rated power of the air heater 27 is generally at least 1000 watts, and preferably 1250 watts. Grill type heaters are particularly advantageous for generating the heat radiation pulses described herein. This is effected by coupling grill heater 16 to full line voltage until a surface temperature thereof ranging between about 600°C and 900°C is reached. Such grill heaters are utilized in forced air convection type ovens such as that disclosed in U.S. Pat. No. 3,379,189. However, in such ovens, the grill heaters are energized during the baking operation only for heating the air within the cooking space, and are connected to only half the line voltage during the baking operation.

A temperature control means, illustrated as control 17, including temperature sensing means illustrated as an expansion rod 18, is coupled to the grill heater 16 and intermittantly activates the heater during baking so that the surface temperature thereof ranges between 600°C and 900°C for a predetermined period of time to generate the described heat radiation pulses, and thereby vary the temperature of the heated air within cooking space 10 about one of the aforementioned mean temperature values. The reference temperature for control 17 is preferably set for baking at a temperature ranging between 150°C and 170°C, and preferably at a temperature of 160°C. Control 17 may be coupled to both air heater 27 and grill heater 16 for controlling these heat sources simultaneously. Generally speaking, the control maintains the temperature of the heated air as it is varied by the heat radiation pulses within temperature limits ranging between about 180°C and 120°C. Within these limits, the surface temperature of the food baked varies in sawtooth fashion and peaks at a temperature which is less than 175°C. To effect the described conditions, the heaters 16 and 27 are generally activated by control 17 for a period of about 3 minutes per pulse. In the illustrated embodiment of the invention, control 17 is coupled thermally to the heated air within cooking space 10 by means of expansion rod 18 disposed outside the muffle 11. The temperature of the heated air in this arrangement is sensed indirectly. Other arrangements in which the air temperature is directly sensed may also be utilized. FIG. 2 graphically illustrates by the solid lines therein, the temperature of the heated air, the surface temperature of the food baked, and the interior temperature of the food baked with respect to baking time for the oven and method of the invention. The dotted lines of FIG. 2 represent the corresponding temperature of the heated air, the surface temperature of the food baked, and the interior temperature of the food baked with respect to baking time for conventional baking ovens.

The temperature control 17 may include, if desired, a programmed timing means coupled to grill heater 16 for activating the grill heater independently of the air heater 27, and independently of the mean temperature value of the heated air within cooking space 10. In such an embodiment, a separate control, including a sensor which directly measures the temperature of the heated air within space 10, is coupled to air heater 27 and the fan wheel motor. This separate control is set to maintain the mean temperature value of the heated air between about 125°C and 135°C, and activates and deactivates air heater 27 and motor 13 at the limits of a predetermined range of temperatures of the heated air spanning a maximum of 15 centigrade degrees. The control may, if desired, activate the fan wheel motor simultaneously with air heater 27; it deactivates the air heater (and electric motor, if desired) shortly after grill heater 16 is activated, since the temperature of the heated air rapidly rises above the relatively low deactivation limit of the control. Subsequent to the usual 3 minute activation of grill heaters 16 by the control, the temperature of the heated air generally drops below the activation limit of the control so that the control maintains the temperature of the heated air by activating air heater 27 until the next heat radiation pulse is generated by grill heater 16.

When the temperature of the heated air is measured directly by the sensing means, air heater 27 and grill heater 16 may be simultaneously activated and deactivated. In such an arrangement control 17 is set so as to activate the air heater and grill heater at a heated air temperature ranging between about 100°C and 120°C, and deactivate the air heater and grill heater at a heated air temperature ranging between about 170°C and 210°C. At the upper deactivation limit, it is preferable if the control 17 deactivates air heater 27 and grill heater 16 at a heated air temperature of about 190°C.

Since motor 13, which drives fan wheel 21 and thereby circulates the heated air within space 10 is preferably operable during the entire baking process, it is preferable to provide means coupled to the grill heater, air heater, and blower motor, responsive to the movement of door 12, to disable the heaters and the motor when the door is opened. This means can comprise an electric door contact switch disposed adjacent door 12 and engagable therewith for disconnecting air heater 27, grill heater 16 and motor 13 from the source of electrical power coupled thereto. In addition, it is also preferable to provide means, also responsive to the movement of door 12, for applying a braking force to fan wheel 21 when the door is opened to stop rotation thereof. Such a means may comprise an electrically or mechanically actuated brake which engages the fan wheel immediately upon the opening of door 12.

If mere grilling of food within space 10 is desired to be carried out, only grill heater 16 need be utilized. If an oven constructed according to the invention were to be so utilized, it should include an additional means within control 17 for effecting a pyrolytic self cleaning process within space 10 by activation of air heater 27 and grill heater 16 so that the heated air temperature within space 10 is raised to a value ranging between about 480°C and 520°C. It is also preferable to provide an interlocking device to secure door 12 in a closed position during the carrying out of this cleaning process. Since only slight soiling of the muffle occurs during such grilling, a single heating of space 10 is usually sufficient to clean the oven when such a heating can be carried out with the full power of the oven. This reduces the duration of the self-cleaning process as well as the electrical current consumption required to effect the process.

Although the invention has been described herein with reference to specific exemplary embodiments, it will be clear to those persons skilled in the art that many changes and modifications may be made thereunto without departing from the broader spirit and scope of the invention as set forth in the appended claims. The specification and drawings are therefore to be regarded in an illustrative rather than in a restrictive sense.

What is claimed is:

1. In a method for baking food including the step of circulating heated air within a closed cooking space, the improvement comprising the step of varying the temperature of the heated air in sawtooth fashion about a mean temperature value ranging between about 120°C and 160°C by generating a plurality of sequential heat radiation pulses of a predetermined amplitude, frequency and duration for baking said food and browning the surface thereof with a minimum of soiling of said cooking space.

2. The method recited in claim 1, wherein said pulse amplitude ranges between at least 70 centigrade degrees when said mean temperature value is 120°C and at least 25 centigrade degrees when said mean temperature value is 160°C.

3. The method recited in claim 2, wherein said heat radiation pulses cause said mean temperature value of said heated air to rise at a rate of at least 5 centigrade degrees per minute.

4. The method recited in claim 1, wherein said temperature of said heated air is varied in sawtooth fashion about said mean temperature value, and wherein said mean temperature value ranges between about 135°C and 145°C.

5. The method recited in claim 4, wherein said pulse amplitude ranges between about 50 and 100 centigrade degrees.

6. The method recited in claim 5, wherein said heat radiation pulses cause said mean temperature value of said heated air to rise at a rate ranging between 10 and 30 centrigrade degrees per minute.

7. The method recited in claim 1, wherein said heat radiation pulses are uniformly distributed over the entire baking time for said food.

8. The method recited in claim 7, wherein said heat radiation pulses are spaced apart during said baking time by a period of at least 5 minutes.

9. The method recited in claim 7, wherein said heat radiation pulses are spaced apart during said baking time by a period of time ranging between about 10 and 20 minutes.

10. The method recited in claim 9, wherein said period of time spacing said pulses is increased to increase the temperature of said heated air.

11. The method recited in claim 1, wherein said heat radiation pulses raise the surface temperature of the food baked to a maximum of about 175°C.

12. The method recited in claim 11, wherein said heat radiation pulses cause said surface temperature of the food baked to rise at a rate of at least 5 centigrade degrees per minute.

13. The method recited in claim 12, wherein the surface temperature of the food baked is raised to a maximum of about 165°C.

14. The temperature recited in claim 13, wherein said heat radiation pulses cause said surface temperature of the food baked to rise at a rate of at least 10 centigrade degrees per minute.

15. The method recited in claim 14, wherein said heat radiation pulses cause said surface temperature of the food baked to vary in sawtooth fashion and generate a plurality of sequential surface temperature pulses in response thereto, the amplitude of said surface temperature pulses ranging between about 10 and 50 centigrade degrees.

16. The method recited in claim 1, wherein said heated air is circulated within said cooking space during the entire baking time of said food.

17. The method recited in claim 16, wherein circulation of said heated air within said cooking space is interrupted during said step of varying the temperature of said heated air.

* * * * *